United States Patent
Chiu et al.

(10) Patent No.: US 6,463,164 B1
(45) Date of Patent: Oct. 8, 2002

(54) MOTION VECTOR ESTIMATION BASED ON STATISTICAL FEATURES OF AN IMAGE FRAME

(75) Inventors: Yi-Jen Chiu, Holmdel, NJ (US); John Hartung, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/137,400

(22) Filed: Aug. 20, 1998

(51) Int. Cl.[7] .................................................. G06K 9/00
(52) U.S. Cl. ........................................................ 382/107
(58) Field of Search ................................ 382/236, 107; 348/407, 408, 409, 410, 413, 415, 416, 420, 400, 401, 402, 403, 390, 699, 384

(56) References Cited

U.S. PATENT DOCUMENTS

| | | | | |
|---|---|---|---|---|
| 5,535,288 A | * | 7/1996 | Chen et al. | 382/236 |
| 5,561,475 A | * | 10/1996 | Jung | 348/699 |
| 5,710,603 A | | 1/1998 | Lee | 348/699 |
| 5,717,470 A | | 2/1998 | Jung | 348/699 |
| 5,796,434 A | * | 8/1998 | Lempel | 348/403.1 |
| 5,808,685 A | * | 9/1998 | Jung | 375/240.1 |
| 5,825,423 A | * | 10/1998 | Jung | 375/240.1 |
| 5,838,391 A | * | 11/1998 | Kim | 348/699 |
| 6,020,933 A | * | 2/2000 | Lee | 348/699 |
| 6,128,042 A | * | 10/2000 | Takashima et al. | 375/240.1 |

* cited by examiner

Primary Examiner—Joseph Mancuso
Assistant Examiner—Ali Bayat

(57) ABSTRACT

A method for estimating motion vectors between a current frame and a reference frame of a video signal wherein the current frame is divided into a plurality of search blocks and the reference frame and is defined to include a plurality of search regions corresponding to the plurality of search blocks, each of the plural search regions having a plurality of candidate blocks. The method includes the steps of calculating horizontal and vertical features of a reference frame based on pixel data of the reference frame; storing the calculated horizontal and vertical features; computing horizontal and vertical features of a $k^{th}$ search block of the plurality of search blocks; comparing the horizontal and vertical features of the $k^{th}$ search block with those of each of the plurality of candidate blocks of the reference frame in a corresponding search region using a computationally-efficient error measure; selecting a candidate block which yields a minimal error measure; and computing a motion vector for the $k^{th}$ search block based on the selected candidate block.

4 Claims, 2 Drawing Sheets

MOTION VECTOR ESTIMATION BASED ON STATISTICAL FEATURES OF AN IMAGE FRAME

BACKGROUND OF THE INVENTION

1. Field of the Invention

The present invention relates to methods for compressing digital video data and, more particularly, to a method for estimating motion vectors based only on the statistical features of successive frames of images.

2. Description of the Related Art

It is well known that digital video systems such, for example, as high definition televisions and video conferencing systems require a substantial amount of digital data to represent each image frame. But transmitting the entire set of digitized video data is impractical and often beyond the capability of most video equipment. Therefore, it is necessary to compress, i.e. reduce, the amount of data needed to represent an image frame prior to its transmission.

Various video compression algorithms have been developed. For example, a spatial compression algorithm analyzes to identify similarities within an image frame and reduces or eliminates spatial redundancies in the frame. A temporal compression algorithm, on the other hand, analyzes to identify similarities between a current image frame and a preceding image frame and thereby detect moving objects between the two frames. Motion vectors indicating the displacement of the moving objects are then transmitted to a receiver which reconstructs the current frame from the prior frame and the motion vectors. A temporal compression algorithm is thus premised on the observation that video data sequences are highly correlated between successive image frames.

Temporal compression algorithms typically use block-matching techniques such as those adopted by standards H.261, H.263, MPEG1 and MPEG2. These block-matching algorithms and the like are discussed in detail by A. N. Netravali and B. G. Haskell in *Digital Pictures: Representation, Compression, and Standards*, 2nd Ed., AT&T Bell Laboratories, 1995, the content of which is incorporated herein by reference in its entirety.

According to a typical block matching algorithm, the current frame is divided into a plurality of search blocks. The size of a search block may range between 8×8 and 32×32 pixels. To determine a motion vector for a search block in the current frame, similarity calculations are performed between the search block of the current frame and each of a plurality of equal-sized candidate blocks included in a generally larger search region within a previous frame. An error estimating measure such as the mean absolute error or mean square error is used to carry out a similarity measurement between the search block of the current frame and each of the candidate blocks in the previous frame search region. From this, motion vectors, each representing the displacement between the search block and a candidate block which yields a minimum error measure, are generated. Since the search block is compared with all possible candidate blocks within a search region corresponding to the search block (i.e. full search block matching), this procedure involves heavy computational requirements which, in turn, requires complex hardware having the capability of very high speed processing and/or a large number of processors for real-time processing.

Attempts have been made to reduce the computational complexity of block-matching algorithms. For example, U.S. Pat. No. 5,710,603 to Lee discloses that the computational complexity involved in estimating motion vectors can be reduced by performing at least the following steps: (1) one-dimensionally comparing a search block from the current frame with a plurality of candidate blocks included in a search region corresponding to the search block, on a block-by-block basis, by employing a one-dimensional error function using horizontal and vertical integral projections to select a predetermined number of candidate blocks in an ascending order of the one-dimensional error function; and (2) two-dimensionally comparing the search block with the predetermined number of candidate blocks selected in step (1), on a block-by-block basis, by employing a two-dimensional error function to thereby select a most similar candidate block to the search block and derive a motion vector representing the displacement of pixels between the search block and the most similar candidate block so as to assign the derived motion vector as the motion vector for the search block. Lee defines integral projection as a summation value of the luminance levels of all of the pixels lying along a horizontal or a vertical pixel line in a given block.

A disadvantage of this motion vector estimating algorithm is that it does not adequately reduce computational complexity because Lee's two-dimensional error function requires a great number of multiplication operations.

It is therefore desirable to further reduce the computational complexity of motion vector estimation while maintaining acceptable picture quality, coding bitrate, coded sequences and other indicia of video performance.

SUMMARY OF THE INVENTION

The present invention accordingly provides a computationally efficient method for estimating motion vectors between two successive frames.

A preferred embodiment of the present invention provides a method for estimating motion vectors between a current frame n and a reference frame n−1 wherein the current frame is divided into a plurality of search blocks and the reference frame is defined to include a plurality of search regions corresponding to the plurality of search blocks, each of the plural search regions having a plurality of candidate blocks, including the steps of:

(a) calculating horizontal features and vertical features of a reference frame based on pixel data of the reference frame as follows:

$$\hat{H}_{n-1}(i, j) = \sum_{p=j}^{j+W-1} \hat{F}_{n-1}(i, p)$$

$$\hat{V}_{n-1}(i, j) = \sum_{p=i}^{i+Y-1} \hat{F}_{n-1}(p, j)$$

where $\hat{H}_{n-1}(i,j)$ denotes the horizontal feature at pixel location $(i,j)$, $\hat{V}_{n-1}(i,j)$ denotes the vertical feature at pixel location $(i,j)$, $\hat{F}_{n-1}(i,j)$ denotes the pixel intensity value at pixel location $(i,j)$ of the reference frame, and W and Y are the one-dimensional ranges of pixels selected for summation in the horizontal and vertical directions, respectively;

(b) storing the calculated horizontal features and vertical features of the reference frame;

(c) computing horizontal features and vertical features of a $k^{th}$ search block of the plurality of search blocks as follows:

$$H_{n,k}(i,j) = \sum_{p=j}^{j+W-1} F_n(i,p)$$

$$V_{n,k}(i,j) = \sum_{p=i}^{i+Y-1} F_n(p,j)$$

where $H_{n,k}(i,j)$ denotes the horizontal feature of the $k^{th}$ search block at pixel location (i,j) of the current frame, $V_{n,k}(i,j)$ denotes the vertical feature of the $k^{th}$ search block at pixel location (i,j) of the current frame, $F_n(i,j)$ denotes the pixel intensity value at pixel location (i,j) of the current frame, and W and Y are as defined in step (a);

(d) comparing the horizontal and vertical features of those of $k^{th}$ search block with those of the plurality of candidate blocks of the reference frame using an error measure defined as follows:

$$en_k(\vec{d}) = \sum_{\vec{i} \in L} \|H_{n,k}(\vec{i}) - \hat{H}_{n-1}(\vec{i} - \vec{d})\| + \|V_{n,k}(\vec{i}) - \hat{V}_{n-1}(\vec{i} - \vec{d})\|$$

where $\vec{i}$ denotes pixel position (i,j), $\vec{d}$ denotes the displacement of a candidate block relative to $\vec{i}$ and L is a feature space;

(e) selecting a candidate block which yields a minimal error measure for the $k^{th}$ search block; and (f) computing a motion vector for the $k^{th}$ search block based on the most similar candidate block.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE CURRENTLY PREFERRED EMBODIMENT

Figure 1:
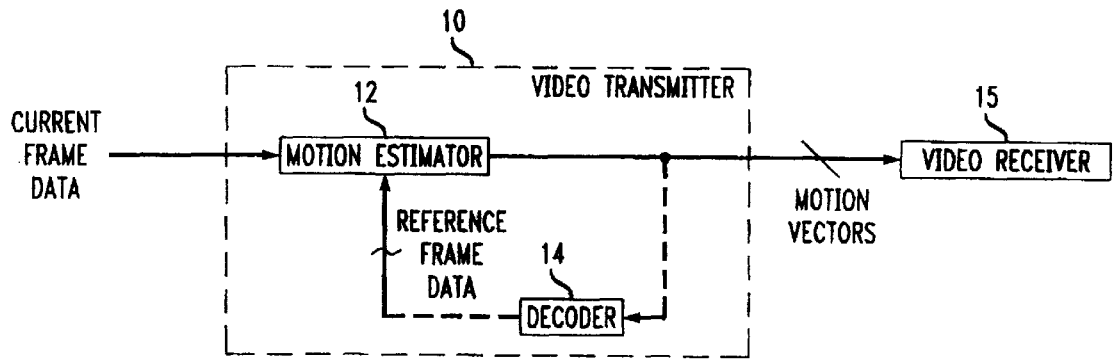
FIG. 1 is a block diagram of an embodiment of the motion estimator of the present invention.

Schematically illustrated in FIG. 1, is a motion estimator 12 for estimating motion vectors between successive frames of images in accordance with the present invention. The motion estimator 12, typically disposed in a video signal transmitter 10, receives pixel data of a current image frame n and a reference image frame n−1 and performs similarity calculations so as to derive motion vectors for pixels of the reference image frame. The reference image frame is an immediately preceding image frame which may be reconstructed by, for example, a decoder 14 in the transmitter 10 from motion vectors for a preceding frame. Alternatively, the reference frame may be retrieved from a storage device (not shown) containing the pixel data of a previously displayed frame generated by, for example, a camera (not shown). Motion vectors computed by the motion estimator 12 are then sent to a video receiver 15 for reconstruction of the current image frame.

Figure 2:
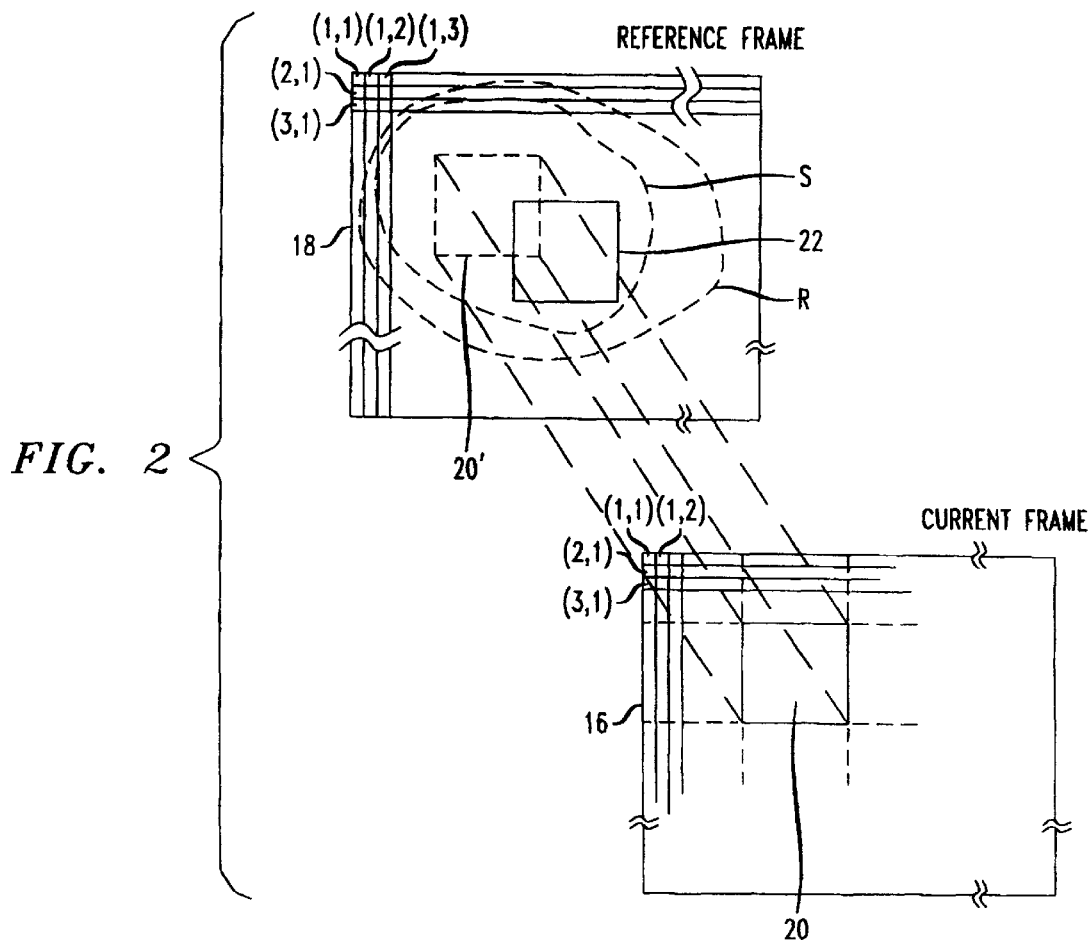
FIG. 2 schematically depicts a current frame, a reference frame, and elements of a block searching algorithm.

FIG. 2 diagrammatically depicts a current image frame 16 and a reference image frame 18. Each of the current image frame and the reference image frame includes a two-dimensional matrix of pixels at positions (i,j) wherein row i varies from 1 to M and column j varies from 1 to N. Thus, the positions of pixels lying along a row i are successively denoted (i,1), (i,2), (i,3) to (i, N); similarly, the positions of pixels lying along a column j are successively denoted (1,j), (2,j), (3,j) to (M, j).

In accordance with block-matching schemes, pixels of the current frame 16 are initially divided into a plurality of search blocks 20 and pixels of the reference frame may be grouped to form a search region or search space S as shown in FIG. 2. The search region S is defined to include pixels neighboring the corresponding or projected search block 20' in the reference image. Pixels located in the search region S are then further subdivided into a plurality of candidate blocks 22 and similarity analysis, in accordance with the present invention, is performed, on a block-by-block basis, between the current frame search block 20 and each of the reference frame candidate blocks 22 in the search region S. After selecting from the similarity analysis the most similar reference frame candidate block, a motion vector is derived in the form of, for example, Δi and Δj for the search block 20.

Preferably, prior to carrying out these block matching schemes, pixels of the reference frame are analyzed using computationally efficient threshold determining algorithms such, for example, as conditional replenishment so as to reduce the number of pixels of the reference frame required for similarity analysis. These threshold determining algorithms eliminate those reference frame pixels whose intensity values are essentially the same as those of the current frame. In other words, those pixels of the reference frame which have not undergone any motion-induced changes in the current frame will not be subjected to any similarity analysis. As schematically illustrated in FIG. 2, the reduced reference frame R may be of any shape or consist of several continguous regions (not shown).

Figure 3:
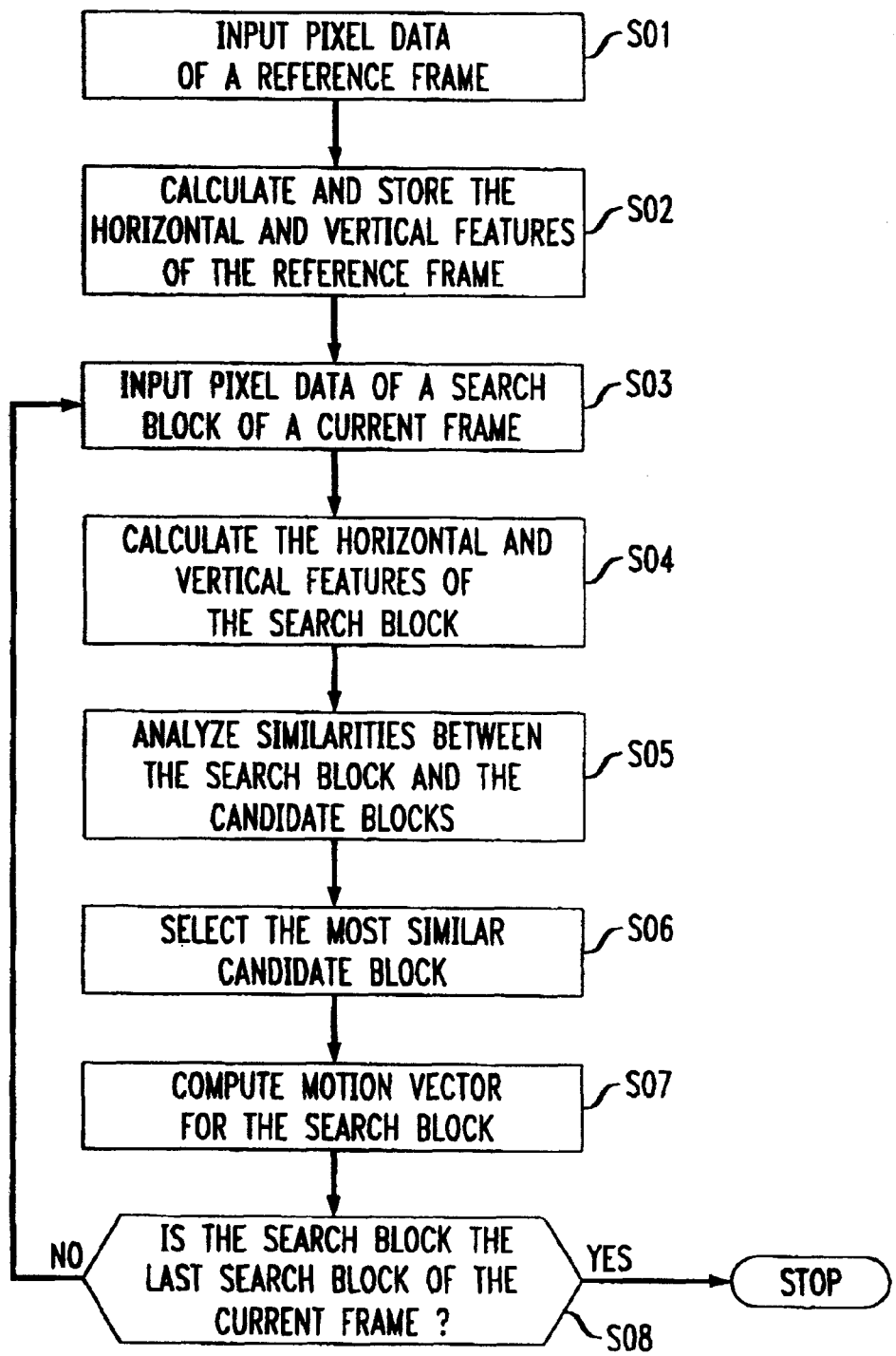
FIG. 3 is a flow chart describing an embodiment of the motion vector estimating algorithm in accordance with the present invention.

FIG. 3 presents a flow chart describing a presently preferred method for implementing the present invention. Initially, at step S01, pixel data such, for example, as luminance and chrominance levels of the reference frame are determined. At step S02, statistical features such as the mean intensity values, the variance or the third order statistic of the pixels in the reference frame (denoted n−1) are calculated as follows:

$$\hat{H}_{n,k}(i,j) = \sum_{k=i}^{j+W-1} \hat{F}_n(i,p)$$

$$\hat{V}_{n,k}(i,j) = \sum_{p=i}^{i+Y-1} \hat{F}_{n-1}(p,j)$$

where $\hat{H}_{n-1}(i,j)$ denotes the horizontal feature at pixel location (i,j), $\hat{V}_{n-1}(i,j)$ denotes the vertical feature at pixel location (i,j), $\hat{F}_{n-1}$ denotes the pixel intensity values at pixel location (i,j) of the reference frame, and W and Y are the one-dimensional ranges for the group of pixels selected for summation in the horizontal and vertical directions, respectively. The calculated values of $\hat{H}_{n-1}(i,j)$ and $\hat{V}_{n-1}(i,j)$ are stored for access in a subsequent step.

The horizontal and vertical features may be calculated on a sub-block basis, i.e. W and Y are less than the horizontal and vertical dimensions of a search block 20, depending on the coding resolution and content of the image frames. For applications such, for example, as typical video conferencing applications which have low spatial and temporal resolution, the preferred value for W and Y is half of the corresponding rows and columns of the search block. Advantageously, this preferred range offers reduction in computational complexity while providing acceptable picture quality, coding bitrate, coded sequences, and other indicia of video performance. Alternatively, the summation range W and Y may be ¼ of the rows and columns of the search block. By way of example, for a search block of 16×16 pixels, a reduced reference frame R of 100×100 pixels, and W=Y=8 (i.e. half of the rows or columns of the 16×16 search block), the horizontal features of the reference are calculated as follows:

$$\hat{H}_{n-1}(1, 1) = \sum_{j=1}^{8} \hat{F}_{n-1}(1, j) \quad \hat{H}_{n-1}(1, 2) = \sum_{j=2}^{9} \hat{F}_{n-1}(1, j) \quad \cdots \quad \hat{H}_{n-1}(1, 93) = \sum_{j=93}^{100} \hat{F}_{n-1}(1, j)$$

$$\hat{H}_{n-1}(2, 1) = \sum_{j=1}^{8} \hat{F}_{n-1}(2, j) \quad \hat{H}_{n-1}(2, 2) = \sum_{j=2}^{9} \hat{F}_{n-1}(2, j) \quad \cdots \quad \hat{H}_{n-1}(2, 93) = \sum_{j=93}^{100} \hat{F}_{n-1}(2, j)$$

$$\cdots \qquad \cdots \qquad \cdots \qquad \cdots$$

$$\hat{H}_{n-1}(93, 1) = \sum_{j=1}^{8} \hat{F}_{n-1}(93, j) \quad \cdots \quad \cdots \quad \hat{H}_{n-1}(93, 93) = \sum_{j=93}^{100} \hat{F}_{n-1}(93, j)$$

For this example, pixel position (1,1) denotes the position of the pixel located at the upper left-the potential search area P of the reference frame.

Similarly, the vertical features of the reference frame are calculated as follows:

$$\hat{V}_{n-1}(1, 1) = \sum_{i=1}^{8} \hat{F}_{n-1}(i, 1) \quad \hat{V}_{n-1}(1, 2) = \sum_{i=1}^{8} \hat{F}_{n-1}(i, 2) \quad \cdots \quad \hat{V}_{n-1}(1, 93) = \sum_{i=1}^{8} \hat{F}_{n-1}(i, 93)$$

$$\hat{V}_{n-1}(2, 1) = \sum_{i=2}^{9} \hat{F}_{n-1}(i, 1) \quad \hat{V}_{n-1}(2, 2) = \sum_{i=2}^{9} \hat{F}_{n-1}(i, 2) \quad \cdots \quad \hat{V}_{n-1}(2, 93) = \sum_{i=2}^{9} \hat{F}_{n-1}(i, 93)$$

$$\cdots \qquad \cdots \qquad \cdots \qquad \cdots$$

$$\hat{V}_{n-1}(93, 1) = \sum_{i=93}^{100} \hat{F}_{n-1}(i, 1) \quad \cdots \quad \cdots \quad \hat{V}_{n-1}(93, 93) = \sum_{i=93}^{100} \hat{F}_{n-1}(i, 93)$$

Although the maximum number of rows and columns of the horizontal and vertical features tables, in this example is 93, it may alternatively be greater or less than 93 depending on the maximum range of a possible candidate block as determined by the particular block-matching algorithm, selected as a general matter of design choice.

Advantageously, the above horizontal and vertical feature calculations can be recursively calculated, that is, a subsequent to-be-calculated statistical feature, $H_{n-1}(i, j+1)$ or vertical feature, $V_{n-1}(i+1, j)$ can be obtained by simply adding to the previously determined statistical feature ($H_{n-1}(i, j)$ or $V_{n-1}(i, j)$) the intensity value of the pixel immediately following the summed pixels and subtracting therefrom the intensity value of the pixel immediately preceding the summed pixels. Expressed mathematically, the horizontal and vertical features are recursively calculated as follows:

$$\hat{H}_{n-1}(i, j+1) = \hat{F}_{n-1}(i, j+w) + \hat{H}_{n-1}(i, j) - \hat{F}_{n-1}(i, j)$$

where $$\hat{H}_{n-1}(i, j) = \sum_{p=j}^{j+W-1} \hat{F}_{n-1}(i, p)$$

and, $$\hat{V}_{n-1}(i+1, j) = \hat{F}_{n-1}(i+Y, j) + \hat{V}_{n-1}(i, j) - \hat{F}_{n-1}(i, j)$$

where $$\hat{V}_{n-1}(i, j) = \sum_{p=i}^{p+Y-1} \hat{F}_{n-1}(p, j)$$

At step S03, pixel data such, for example, as pixel intensity values of one of the blocks (e.g. a $k^{th}$ search block) in the current frame are read. At step S04, the horizontal features and vertical features of the $k^{th}$ search block are calculated as follows:

$$H_{n,k}(i, j) = \sum_{p=0}^{W-1} F_n(i, j+p)$$

where i varies from $i_0$ to (b−1), b being the vertical dimension of the search block; and $j=j_0+cW$, wherein c varies incrementally from 0 to (a/W)−1, i.e. c=0, . . . , (a/W)−1.

$$V_{n,k}(i, j) = \sum_{k=0}^{Y-1} F_n(i+p, -j)$$

where j varies from $j_0$ to $(a-1)$, a being the horizontal dimension of the search and block; and $i=i_0+dY$, wherein d varies incrementally from 0 to $(b/Y)-1$, i.e. $d=0, \ldots, (b/Y)-1$. As was defined above, W and Y are the one-dimensional ranges for the group of pixels selected for summation in the horizontal and vertical directions respectively.

In this step, the horizontal and vertical features of the search block cannot be recursively calculated in step S01. The summing operations of this step are performed for each row and column, (or a segments thereof) of the pixels in each search block as specified by W or Y and are thus non-repetitive in the sense that pixels included in a preceding calculation are excluded from succeeding calculation. Therefore, the size of the matrix containing the horizontal or vertical features of the search block is necessarily different from the recursively-calculated matrix generated in step S01.

The summing operations of this step for a 16×16 search block are exemplarily illustrated as follows:

$$H_{n,k}(i_0, j_0) = \sum_{p=0}^{7} F_n(i_0, j_0 + p) \qquad H_{n,k}(i_0, j_0 + 8) = \sum_{p=0}^{7} F_n(i_0, j_0 + 8 + p)$$

$$H_{n,k}(i_0 + 1, j_0) = \sum_{p=0}^{7} F_n(i_0 + 1, j_0 + p) \qquad H_{n,k}(i_0 + 1, j_0 + 8) = \sum_{p=0}^{7} F_n(i_0 + 1, j_0 + 8 + p)$$

$$H_{n,k}(i_0 + 2, j_0) = \sum_{p=0}^{7} F_n(i_0 + 2, j_0 + p) \qquad H_{n,k}(i_0 + 2, j_0 + 8) = \sum_{p=0}^{7} F_n(i_0 + 2, j_0 + 8 + p)$$

$$\ldots \qquad \ldots$$

$$H_{n,k}(i_0 + 15, j_0) = \sum_{p=0}^{7} F_n(i_0 + 15, j_0 + p) \quad H_{n,k}(i_0 + 15, j_0 + 8)) = \sum_{p=0}^{7} F_n(i_0 + 15, j_0 + 8 + p)$$

where $i_0$ and $j_0$ example, the position of the pixel at the upper left hand corner of the k search block.

Similarly, the vertical features of this search block are computed as follows:

$$V_{n,k}(i_0, j_0) = \sum_{p=0}^{7} F_n(i_0 + p, j_0) \qquad V_{n,k}(i_0 + 8, j_0) = \sum_{p=0}^{7} F_n(i_0 + 8 + p, j_0)$$

$$V_{n,k}(i_0, j_0 + 1) = \sum_{p=0}^{7} F_n(i_0 + p, j_0 + 1) \qquad V_{n,k}(i_0 + 8, j_0 + 1) = \sum_{p=0}^{7} F_n(i_0 + 8 + p, j_0 + 1)$$

$$\ldots \qquad \ldots$$

$$V_{n,k}(i_0, j_0 + 15) = \sum_{p=0}^{7} F_n(i_0 + p, j_0 + 15) \quad V_{n,k}(i_0 + 8, j_0 + 15) = \sum_{p=0}^{7} F_n(i_0 + 8 + p, j_0 + 15)$$

At step S05, similarity analysis is performed by comparing the horizontal and vertical features of the $k^{th}$ search block with those of the candidate blocks on a block-by-block basis in a search region using the calculated error measure $en_k$:

$$en_k(\vec{d}) = \sum_{\vec{i} \in L} \left\| H_{n,k}(\vec{i}) - \hat{H}_{n-1}(\vec{i} - \vec{d}) \right\| + \left\| V_{n,k}(\vec{i}) - \hat{V}_{n-1}(\vec{i} - \vec{d}) \right\|$$

where $\vec{1}$ denotes pixel position (i,j), $\vec{d}$ denotes the displacement of a candidate block relative to $\vec{1}$, L denotes a feature space, and the expression represents the mean square error (MSE) or the mean absolute error (MAE) of the quantity bracketed therebetween. MAE is preferably used because it is free of multiplication operations and thus more computationally efficient than MSE, and provides comparably accurate results.

At step S06, the candidate block which yields the smallest or minimal error measure $en_k$ for the $k^{th}$ search block is selected. The selected candidate block is the candidate block most similar to the $k^{th}$ search block. Expressed in another way:

$$mv_k = \arg \min_{\vec{d} \in S} en_k(\vec{d})$$

where $mv_k$ is the motion vector for the $k^{th}$ search block, S is a search space.

At step S07, the motion vector between the $k^{th}$ search block and the selected candidate block is computed. At step S08, the algorithm checks whether the $k^{th}$ search block is the last search block of the current frame. If so, motion vectors for the entire frame have been generated, and the process ends; if not, steps S03 through S07 are repeated for the next search block.

It has been found that use of the inventive algorithm achieves data rate and picture quality results comparable to a full-search block-matching algorithm while requiring significantly less computational power and complexity than a full-search algorithm.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for estimating motion vectors between a current frame and a reference frame wherein the current frame is divided into a plurality of search blocks and the reference frame is defined to include a plurality of search regions defined by search blocks of the plurality of search blocks, each of the plural search regions having a plurality of candidate blocks, comprising the steps of:

(a) calculating horizontal and vertical features of a reference frame based on pixel data of the reference frame;

(b) storing the calculated horizontal and vertical features;

(c) computing horizontal and vertical features of a $k^{th}$ search block of the plurality of search blocks;

(d) comparing the horizontal and vertical features of the $k^{th}$ search block with those of each of the plurality of candidate blocks of the reference frame in a search region using an error measure;

(e) selecting a candidate block which yields a minimal error measure; and (f) computing a motion vector for the $k^{th}$ search block based on the selected candidate block;

wherein in step (a) the horizontal and vertical features of a reference frame are calculated as follows:

$$\hat{H}_{n-1}(i, j) = \sum_{p=j}^{j+W-1} \hat{F}_{n-1}(i, p)$$

$$\hat{V}_{n-1}(i, j) = \sum_{p=i}^{i+Y-1} \hat{F}_{n-1}(p, j)$$

where $\hat{H}_{n-1}(i, j)$ denotes the horizontal features at pixel location (i,j), $\hat{V}_{n-1}(i, j)$ denotes the vertical features at pixel location (i,j), $\hat{F}_{n-1}(i, j)$ denotes pixel intensity values at pixel location (i,j) of the reference frame, and W and Y are the horizontal and vertical ranges of pixels selected for summation.

2. The method of claim 1, wherein step (c) the horizontal and vertical features of a $k^{th}$ search block of the plurality of search blocks are computed as follows:

$$H_{n,k}(i, j) = \sum_{p=j}^{j+W-1} F_n(i, p)$$

$$V_{n,k}(i, j) = \sum_{p=i}^{i+Y-1} F_n(p, j)$$

where $H_{n,k}(i,j)$ denotes the horizontal features of the $k^{th}$ search block and $V_{n,k}(i,j)$ denotes the vertical features of the $k^{th}$ search block.

3. The method of claim 2, wherein the error measure is defined as follows:

$$en_k(\vec{d}) = \sum_{\vec{l} \in L} \left\| H_{n,k}(\vec{l}) - \hat{H}_{n-1}(\vec{l} - \vec{d}) \right\| + \left\| V_{n,k}(\vec{l}) - \hat{V}_{n-1}(\vec{l} - \vec{d}) \right\|$$

where $\vec{l}$ notes pixel position (i,j), $\vec{d}$ denotes the displacement of a candidate block relative to $\vec{l}$ and L is a feature space.

4. The method of claim 3, wherein a mean absolute error is used to calculate $$\left\| H_{n,k}(\vec{l}) - \hat{H}_{n-1}(\vec{l} - \vec{d}) \right\|$$

and $$\left\| V_{n,k}(\vec{l}) - \hat{V}_{n-1}(\vec{l} - \vec{d}) \right\|$$

* * * * *